United States Patent
Jeong et al.

(10) Patent No.: US 8,929,656 B2
(45) Date of Patent: Jan. 6, 2015

(54) METHOD AND APPARATUS FOR DETECTING IMPORTANT INFORMATION FROM MOVING PICTURE

(75) Inventors: Jin-guk Jeong, Yongin-si (KR); Kee-chul Jung, Seoul (KR); Dong-keun Lee, Seoul (KR); Min-kyu Jung, Seoul (KR); Sung-kuk Chun, Seoul (KR)

(73) Assignees: Samsung Electronics Co., Ltd., Suwon-si (KR); Soongsil University Research Consortium techno-PARK, Seoul (KR)

(*) Notice: Subject to any disclaimer, the term of this patent is extended or adjusted under 35 U.S.C. 154(b) by 933 days.

(21) Appl. No.: 12/730,836

(22) Filed: Mar. 24, 2010

(65) Prior Publication Data

US 2011/0052061 A1    Mar. 3, 2011

(30) Foreign Application Priority Data

Aug. 25, 2009 (KR) .................. 10-2009-0078842

(51) Int. Cl.
*G06K 9/34* (2006.01)
*G06K 9/00* (2006.01)
*G06T 7/00* (2006.01)

(52) U.S. Cl.
CPC .......... *G06K 9/00711* (2013.01); *G06T 7/0083* (2013.01); *G06T 2207/30221* (2013.01)
USPC ............................. 382/173; 382/203; 382/292

(58) Field of Classification Search
CPC ............. G06K 9/00711; G06T 7/0083; G06T 2207/30221
USPC ......... 382/173, 203, 226, 228, 180, 293, 295, 382/296, 297, 298, 301; 348/564, 582, 583
See application file for complete search history.

(56) References Cited

U.S. PATENT DOCUMENTS

| 8,055,076 B2* | 11/2011 | Kikuchi et al. | 382/203 |
| 2006/0112337 A1* | 5/2006 | Jung et al. | 715/723 |
| 2007/0201764 A1* | 8/2007 | Jung et al. | 382/292 |
| 2008/0064490 A1* | 3/2008 | Ellis | 463/25 |
| 2008/0066111 A1* | 3/2008 | Ellis et al. | 725/57 |
| 2008/0298767 A1* | 12/2008 | Jeong et al. | 386/52 |
| 2008/0303942 A1 | 12/2008 | Chang et al. | |
| 2009/0074291 A1* | 3/2009 | Iinuma | 382/178 |

FOREIGN PATENT DOCUMENTS

KR    10-0764175 B1    10/2007

\* cited by examiner

*Primary Examiner* — Mekonen Bekele
(74) *Attorney, Agent, or Firm* — Sughrue Mion, PLLC

(57) ABSTRACT

Provided is a method of detecting important information from a moving picture. The method includes: detecting first candidate areas that are presumed to include important information in a plurality of moving picture frames by using stop edge information, which is edge information overlapped at a same position throughout the plurality of moving picture frames, from among edge information in at least two received moving picture frames; determining second candidate areas by performing grouping on the stop edge information according to a position of the stop edge information in the first candidate areas; analyzing the second candidate areas determined in the at least two moving picture frames; and detecting important information areas from each of the at least two moving picture frames based on the analysis.

21 Claims, 6 Drawing Sheets

METHOD AND APPARATUS FOR DETECTING IMPORTANT INFORMATION FROM MOVING PICTURE

CROSS-REFERENCE TO RELATED PATENT APPLICATION

This application claims the priority from Korean Patent Application No. 10-2009-0078842, filed on Aug. 25, 2009 in the Korean Intellectual Property Office, the disclosure of which is incorporated herein by reference in its entirety.

BACKGROUND

1. Field

Apparatuses and methods consistent with the present general inventive concept relate to a method and apparatus for detecting important information from a moving picture.

2. Description of the Related Art

In general, if users, who are located out of view of a broadcast device (e.g., a television), desire to know the score of sports games, or the like, which are currently in progress, mobile phones may be used to access a portal server, and score information provided from the portal server may be identified.

SUMMARY

The exemplary embodiments provide a method and apparatus for providing important information from a moving picture.

According to an aspect of the exemplary embodiments, there is provided a method of detecting important information, the method including: detecting first candidate areas that are presumed to include important information in a plurality of moving picture frames by using stop edge information, which is edge information overlapped at a same position throughout the plurality of moving picture frames, from among edge information in at least two received moving picture frames; determining second candidate areas by performing grouping on the stop edge information according to the position of the stop edge information in the first candidate areas; analyzing the second candidate areas determined in the at least two moving picture frames; and detecting important information areas from each of the at least two moving picture frames based on the analysis.

The detecting of the first candidate areas may include: respectively dividing the at least two moving picture frames into a plurality of analyzed areas; detecting the edge information from the plurality of analyzed areas; detecting the edge information that is overlapped at a same position throughout the plurality of moving picture frames from among the edge information detected from the plurality of analyzed areas as the stop edge information; and detecting the first candidate areas, from among the analyzed areas, in which a ratio of areas occupied by the stop edge information is above a predetermined critical value.

In the detecting of the edge information from the plurality of analyzed areas, the analyzed areas which are presumed to not include important information from among the plurality of analyzed areas based on the positions of the analyzed areas in the moving picture frames are excluded from being analyzed for the edge information.

The determining of the second candidate areas may include: dividing one of the moving picture frames into a plurality of grouping areas; dividing the stop edge information included in the first candidate areas into a plurality of stop edge information; allocating each of the divided stop edge information to one of the grouping areas based on a distance between center positions of the grouping areas and the divided stop edge information; and determining the second candidate areas by repeatedly performing grouping based on a distance between centers of the divided stop edge information included in the grouping areas in each of the grouping areas and the divided stop edge information.

The analyzing of the second candidate areas may include: converting the stop edge information included in the second candidate areas to be displayed in a predetermined number of colors; performing binarization on the stop edge information that is converted in the second candidate areas to be displayed in two colors; dividing the second candidate areas into a plurality of areas; and analyzing the binarized stop edge information included in each of the divided areas.

The analyzing of the binarized stop edge information included in each of the divided areas may include: determining whether the binarized stop edge information respectively included in the divided areas of the second candidate areas is a character or number; recognizing characters or numbers indicated by one of the stop edge information respectively included the divided areas; and analyzing the binarized stop edge information respectively included in the divided areas based on the recognized characters or numbers.

In the detecting of the important information areas, the important information areas may be detected based on a number of characters and numbers respectively included in the second candidate areas.

When the stop edge information included each of the divided areas are recognized as numbers in the detecting of the important information areas, the important information areas may be detected based on initial values of the numbers and whether a time consumed for changing the numbers is above a critical value.

The method may further include reproducing a highlight of a sports game based on a time corresponding to when a number of a score of the sports game, from among the important information included in the important information areas, is changed, after detecting the important information areas from the at least two moving picture frames.

The method may further include transmitting one of the important information areas detected from at least two moving picture frames to a third party in an image form or transmitting the important information included in the important information areas to a third party in a message form using characters and numbers, after detecting the important information areas from at least two moving picture frames.

According to another aspect of the exemplary embodiments, there is provided an apparatus for detecting important information, the apparatus including: a first candidate area detecting unit which detects first candidate areas that are presumed to include important information in a plurality of moving picture frames by using stop edge information, which is edge information overlapped at a same position throughout the plurality of moving picture frames, from among edge information in at least two moving picture frames; a second candidate area determining unit which determines second candidate areas by performing grouping on the stop edge information according to the position of the stop edge information in the first candidate areas; an analyzing unit which analyzes the second candidate areas determined in the at least two moving picture frames; and an important information area detecting unit which detects important information areas from each of the at least two moving picture frames based on the analysis.

According to another aspect of the exemplary embodiments, there is provided a computer readable recording medium having embodied thereon a computer program for causing a computer to execute a method of detecting important information, the method including: detecting first candidate areas that are presumed to include important information in a plurality of moving picture frames by using stop edge information, which is edge information overlapped at a same position throughout the plurality of moving picture frames, from among edge information in at least two received moving picture frames; determining second candidate areas by performing grouping on the stop edge information according to the position of the stop edge information in the first candidate areas; analyzing the second candidate areas determined in the at least two moving picture frames; and detecting important information areas from each of the at least two moving picture frames based on the analysis.

BRIEF DESCRIPTION OF THE DRAWINGS

The above and other features and advantages of the exemplary embodiments will become more apparent by describing in detail exemplary embodiments thereof with reference to the attached drawings in which.

DETAILED DESCRIPTION OF THE INVENTION

Hereinafter, one or more exemplary embodiments will be described more fully with reference to the accompanying drawings.

Figure 1:
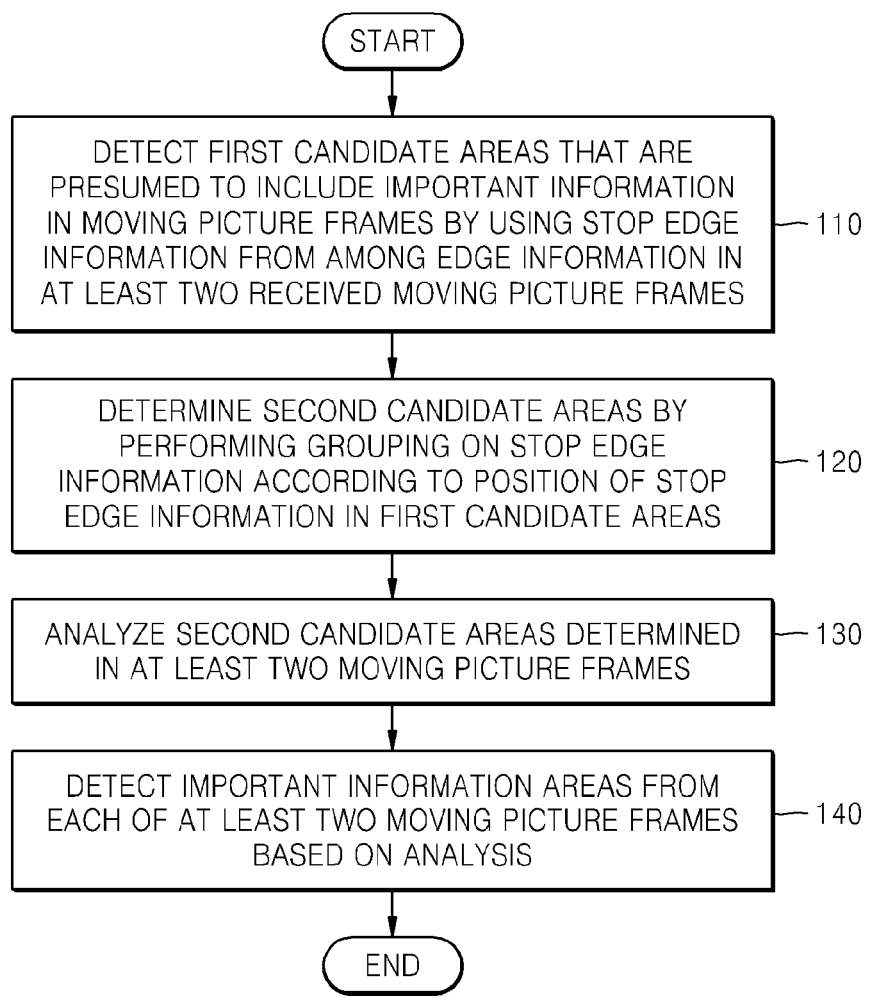
FIG. 1 is a flowchart illustrating a method of detecting important information from a moving picture according to an exemplary embodiment.

FIG. 1 is a flowchart illustrating a method of detecting important information from a moving picture, according to an exemplary embodiment.

Stop edge information is edge information overlapped at the same position throughout a plurality of moving picture frames. In operation 110, stop edge information, from among edge information in at least two received moving picture frames, is used to detect first candidate areas that are presumed to include important information in the moving picture frames.

Here, the stop edge information exists at the same position throughout a plurality of moving picture frames, and thus, is edge information overlapped at the same position throughout a plurality of moving picture frames. In an opposite sense, edge information that is not overlapped in the moving picture frames is motion edge information.

For example, when a moving picture is transmitted from a broadcasting station, the broadcasting station adds predetermined information to the moving picture to overlap the moving picture, and then the moving picture is transmitted. The added information may be present at the same position throughout a plurality of moving picture frames and may be the stop edge information. Here, the important information added to the moving picture by a broadcasting station may be the score of sports games and/or a title of a the sporting event or news.

However, in addition to the important information, immovable people or objects may be detected as the stop edge information such that not all areas including the stop edge information also include the important information. Accordingly, in operation 110, the areas including the stop edge information are detected as the first candidate areas that are presumed to include important information. A method of detecting the first candidate areas will be described in more detail with reference to FIG. 2.

In operation 120, according to the position of the stop edge information included in the first candidate areas in the moving picture frames, grouping of the stop edge information is performed on determined second candidate areas.

That is, in operation 120, a process of grouping the stop edge information included in the first candidate areas detected in operation 110 into a plurality of groups is performed, and as a result, the second candidate areas are determined. For example, in the current exemplary embodiment, a K-means clustering may be performed on the stop edge information included in the first candidate areas in order to determine the second candidate areas.

A method of detecting the second candidate areas will be described in more detail with reference to FIG. 3.

In operation 130, the second candidate areas in at least two moving picture frames and determined in operation 120 are analyzed.

A method of analyzing the second candidate areas in each moving picture frame will be described in more detail with reference to FIGS. 4 and 5.

In operation 140, based on the analysis performed in operation 130, important information areas are detected from each of the at least two moving picture frames.

More specifically, important information areas in the second candidate areas included in each of the at least two moving picture frames are detected.

For example, when news is broadcasted on a television (TV), the title of the news may be the important information. Here, a second candidate area including many characters and numbers has a high possibility of being the title of the news from among the second candidate areas included in each of the moving picture frames so that the second candidate area may be detected as an important information area.

In addition, when a sports game is broadcasted on the TV, the score of the game may be the important information. Here, a second candidate area in which many characters and numbers are included and the numbers are changed every minute or every several ten minutes has a high possibility of being score information from among the second candidate areas included in each of the moving picture frames so that the second candidate area may be detected as an important information area.

The standard of detecting the important information area from among the second candidate areas is not limited to the above examples and various standards of detecting information added to moving pictures by a broadcasting station may be further applied.

In the current exemplary embodiment, stop edge information is used to detect the important information, and thus, a more accurate result than that of the related art may be obtained. Also, the process is performed only on the candidate areas so that important information may be rapidly detected.

Figure 2:
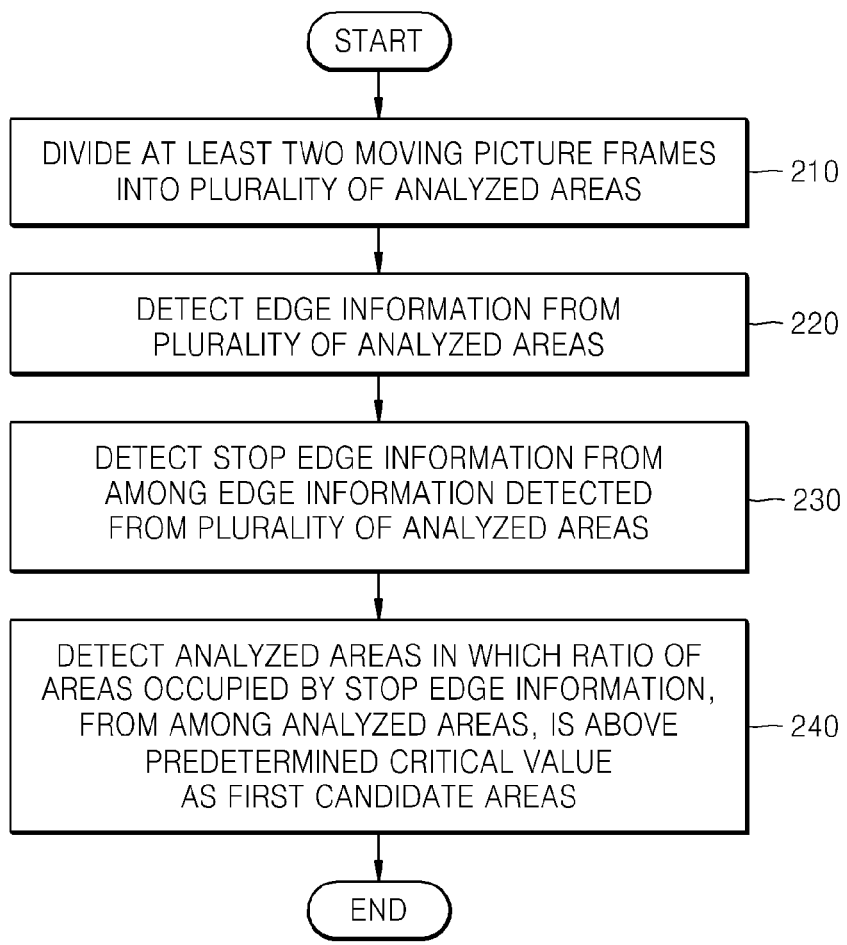
FIG. 2 is a flowchart illustrating a method of detecting first candidate areas, according to an exemplary embodiment.

FIG. 2 is a flowchart illustrating a method of detecting the first candidate areas, according to an embodiment of the present invention.

In operation 210, the at least two moving picture frames are respectively divided into a plurality of analyzed areas.

For example, each of the moving picture frames may be divided into analyzed areas having various sizes, such as areas having 8×8 pixels and areas having 16×16 pixels.

In operation 220, edge information is detected from the analyzed areas.

In another exemplary embodiment, edge information may not be detected from the analyzed areas that are presumed to not include important information from among the plurality of analyzed areas based on the positions of the analyzed areas in the moving picture frames. That is, analyzed areas which are located in positions which do not generally include important information may be presumed to not include important information based on their position. Accordingly, these analyzed areas can be excluded from examination for edge information.

For example, it is generally uncommon that the important information is present at the top left of the moving picture frames so that the edge information may not be detected from the top left of the analyzed areas.

In operation 230, stop edge information is detected from the edge information detected from the analyzed areas.

In operation 240, from among the analyzed areas, the analyzed areas in which a ratio of areas occupied by the stop edge information is above a predetermined critical value are detected as the first candidate areas.

Accordingly, from among the analyzed areas, whether the ratio of areas occupied by the stop edge information is above a critical value is determined when the first candidate areas are detected because the stop edge information which corresponds to the information added to the moving picture by a broadcasting station is not scattered in the moving picture frames but is instead centralized at a predetermined area. Thus, there is a low possibility that the stop edge information scattered in the moving picture frames is the important information so that the scattered stop edge information may be excluded from the first candidate areas.

Figure 3:
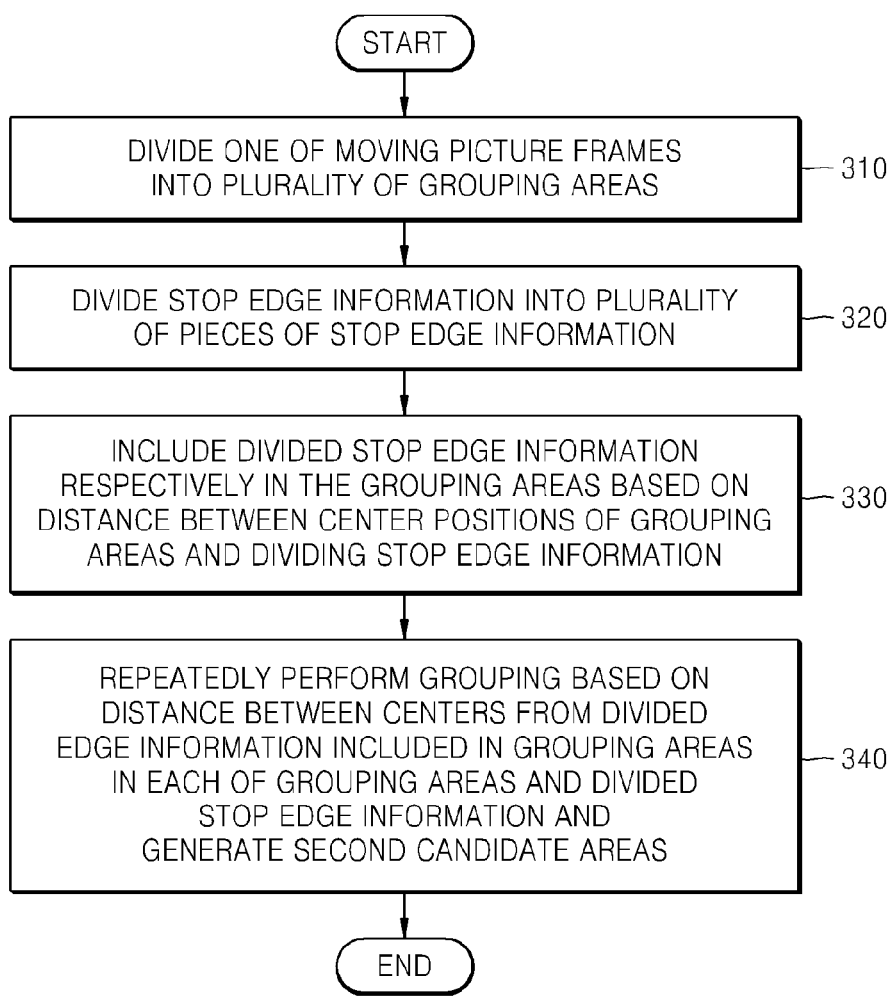
FIG. 3 is a flowchart illustrating a method of determining second candidate areas, according to an exemplary embodiment.

FIG. 3 is a flowchart illustrating a method of determining the second candidate areas, according to an exemplary embodiment.

In operation 310, one of the moving picture frames is divided into a plurality of grouping areas.

Here, the number of the grouping areas may be determined in advance. For example, each of the moving picture frames may be divided into 9 grouping areas each having the same sizes.

In operation 320, the stop edge information is divided into a plurality of pieces of stop edge information.

Here, the stop edge information may be divided by sizes of 1×1 pixels, 2×2 pixels, and 4×4 pixels so as to divide the stop edge information. The sizes of the divided stop edge information are not limited to 1×1 pixels, 2×2 pixels, and 4×4 pixels and may vary.

In operation 330, the divided stop edge information is respectively included in the grouping areas based on the distance between center positions of the grouping areas and the divided stop edge information.

More specifically, the divided stop edge information is respectively included in the grouping areas having the center positions that are nearest to the divided stop edge information.

In operation 340, grouping is repeatedly performed based on the distance between the centers from the divided stop edge information included in the grouping areas in each of the grouping areas and the divided stop edge information so as to determine the second candidate areas.

More specifically, the centers from the divided stop edge information included in the grouping areas in each of the grouping areas are determined as new center positions and the distance between the new center positions and each divided stop edge information is measured so as to include the divided stop edge information in the grouping areas having the new center positions located closest to the divided stop edge information.

When such a grouping is repeatedly performed and the distance difference between the previous center positions and the new center positions is below a predetermined critical value, the grouping areas at that time are determined as final grouping areas and the final grouping areas become the second candidate areas.

Accordingly, when the second candidate areas are determined from one moving picture frame, the same second candidate areas may be used with respect to remaining moving picture frames.

The grouping method illustrated in FIG. 3 is performed based on K-means clustering. However, in the exemplary embodiment, all grouping methods, which may group the divided stop edge information, may be used, in addition to K-means clustering.

Figure 4:
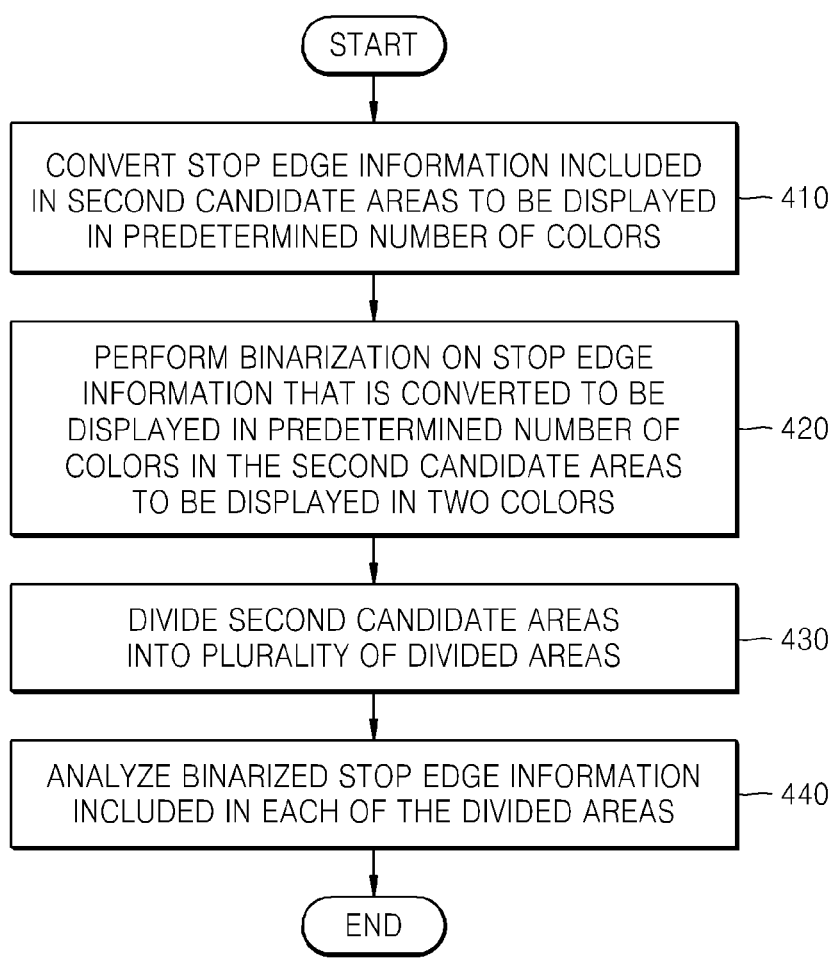
FIG. 4 is a flowchart illustrating a method of analyzing stop edge information included in second candidate areas, according to an exemplary embodiment.

FIG. 4 is a flowchart illustrating a method of analyzing the stop edge information included in the second candidate areas, according to an exemplary embodiment.

In operation 410, the stop edge information included in the second candidate areas is converted to be displayed in a predetermined number of colors.

The stop edge information is converted to be displayed in a predetermined color in order to prevent the stop edge information having similar brightness from being incorrectly classified in a binarization process which will be described later. In operation 410, octree segmentation or neural network segmentation may be used for the conversion.

In another exemplary embodiment, when the stop edge information having the same color as a result of the color conversion in operation 410 is included in the grouping areas that are adjacent to each other and are different from each other, a process of combining the grouping areas and generating one grouping area may be further performed.

In operation 420, binarization is performed on the stop edge information that is converted to be displayed in a predetermined number of colors, in each of the second candidate areas to be displayed in two colors.

For example, the stop edge information that is converted to be displayed in a predetermined number of colors may be converted to only have black or white.

Accordingly, a purpose of performing the binarization is to remove the stop edge information, except the stop edge information which corresponds to characters or numbers, in the moving picture frames. For example, the stop edge information which corresponds to characters or numbers in the moving picture frames may be displayed with white and other stop edge information may be displayed with black.

In operation 430, the second candidate areas are divided into a plurality of divided areas.

Here, the second candidate areas may be divided to have an arbitrary size. However, the second candidate areas may be divided into the divided areas having a size so as to include the stop edge information that corresponds to one character or one number.

For example, there are slight intervals between the characters, the characters and the numbers, and the numbers each including the second candidate areas in each of the moving picture frames, and the stop edge information may not be present in the intervals so that the second candidate areas may be divided into a plurality of divided areas based on the intervals.

In operation 440, the binarized stop edge information included in each of the divided areas is analyzed.

Here, the stop edge information which corresponds to one character or one number may be included in one divided area. However, in another exemplary embodiment, a plurality of pieces of stop edge information may be included in one divided area.

Accordingly, the reason for analyzing the second candidate areas by dividing the second candidate areas into a plurality of areas is to determine whether the stop edge information included in each of the divided areas is a character or number.

Operations 410 through 440 are performed on the second candidate areas in at least two moving picture frames.

Figure 5:
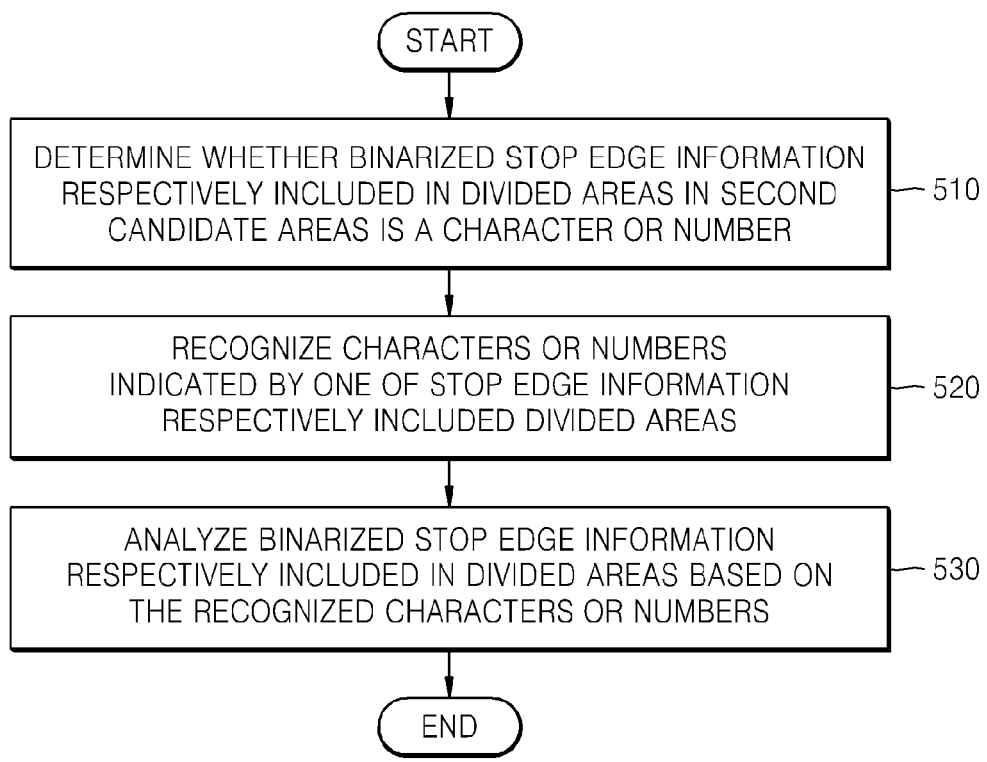
FIG. 5 is a flowchart illustrating a method of analyzing stop edge information included in divided areas in second candidate areas, according to an exemplary embodiment.

FIG. 5 is a flowchart illustrating a method of analyzing the binarized stop edge information included in the divided areas of the second candidate areas, according to an exemplary embodiment.

In operation 510, whether the binarized stop edge information respectively included in the divided areas of the second candidate areas is a character or number is determined.

For example, when the binarized stop edge information included in the divided areas has a non-regular form, it may be determined that the stop edge information is not a character or number.

In operation 520, the characters or numbers indicated by the binarized stop edge information respectively included the divided areas are recognized.

Here, in order to recognize the characters or numbers, the regularity of the binarized stop edge information is analyzed, and the directivity and ratio of the edge information may be considered.

For example, the binarized stop edge information may have a directivity such as a diagonal direction, a horizontal direction, and a perpendicular (i.e., vertical) direction. Number 1 has the edge information in a perpendicular direction and number 0 has the edge information in both perpendicular direction and horizontal direction.

In addition, an edge ratio is also called edge intensity and is denoted as a length ratio between strokes of characters or numbers. For example, when the stop edge information is "E" and "F", a third horizontal component from the top of "E" (i.e., the bottom horizontal component) has the same length as first and second horizontal components from the top of "E" (i.e., the top and middle horizontal components), whereas a third horizontal component from the top of "F" has a shorter length than that of first and second horizontal components from the top of "F". Thus, according to the length ratio of the third horizontal component to the first and second horizontal components, "E" and "F" may be classified.

In another exemplary embodiment, a process of determining whether the at least one stop edge information included in the divided areas is a character or number as in operation 510 is omitted. Instead, characters or numbers are analyzed in view of the stop edge information included in all divided areas, and as a result, if there is no corresponding character or number, it may be determined that the stop edge information is not the character or number. That is, characters and numbers are searched for among the stop edge information, and if none are found, it may be determined that the stop edge information does not correspond to a character or number.

In operation 530, based on the recognized character or number, the stop edge information respectively included in the divided areas is analyzed.

Since the stop edge information respectively included in the divided areas of the second candidate areas is analyzed, the important information areas may be detected from the second candidate areas in at least two moving picture frames.

For example, the important information areas may be detected based on the number of characters and numbers included in the second candidate areas in each moving picture frame.

In case of a soccer game, for example, the important information is the score of the game. In general, the names of the soccer teams and current time may be displayed along with the score of the game so that the second candidate area only including characters or the second candidate area only including numbers may not be the important information area.

Figure 6:
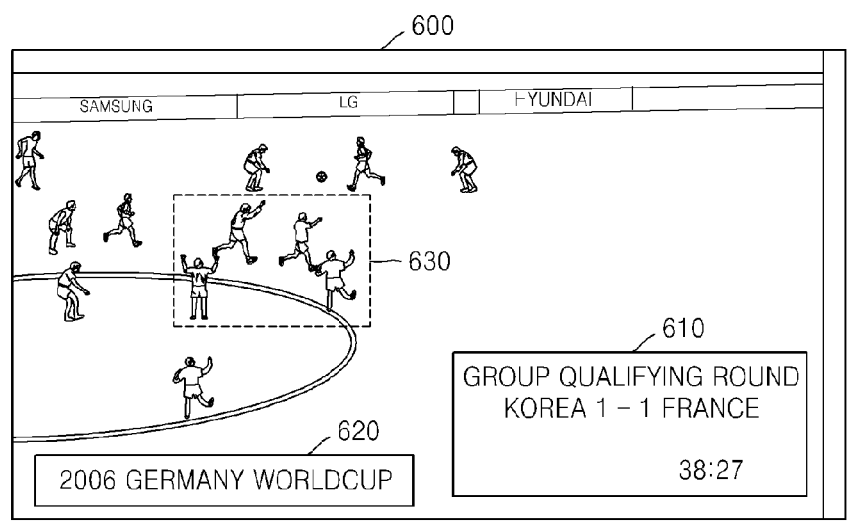
FIG. 6 is illustrates an example of an application of the method of detecting important information, according to an exemplary embodiment.

FIG. 6 is illustrates an example of an application of the method of detecting important information, according to an exemplary embodiment.

In detail, FIG. 6 is a diagram for explaining a method of detecting a scoreboard 610 in a soccer game.

Referring to FIG. 6, information added by a broadcasting station is the scoreboard 610 and title information 620. Here, the important information is the scoreboard 610. Hereinafter, the method of detecting the scoreboard 610 illustrated in FIG. 6 is described.

In a first process, a moving picture frame 600 and a moving picture frame (not illustrated) adjacent to the moving picture frame 600 are used to detect the stop edge information that is overlapped at the same position in two moving picture frames, and the detected stop edge information is used to detect the first candidate areas. In the current exemplary embodiment, the moving picture frame 600 illustrated in FIG. 6 and the moving picture frame adjacent to the moving picture frame 600 are the only moving picture frames used. However, in another exemplary embodiment, a plurality of moving picture frames may be used, in addition to the moving picture frame 600 illustrated in FIG. 6.

More specifically, in the first stage, the moving picture frame 600 and the moving picture frame (not illustrated) adjacent to the moving picture frame 600 are divided into a plurality of analyzed areas, and the stop edge information is detected in each analyzed area. In another exemplary embodiment, the stop edge information may be detected while the moving picture frames are not divided into a plurality of analyzed areas.

In FIG. 6, players who are in motion from among players illustrated in FIG. 6 are motion edge information and thus may not be detected. However, the players who are still, signboards such as "SAMSUNG", "LG", and "HYUNDAI", the scoreboard 610, and the title information 620 may be detected as the stop edge information.

Here, there is a low possibility that the scoreboard 610 is located at the top left area and the top center-area. Thus, when the stop edge information is to be detected, the stop edge information may be detected in the analyzed areas except for the analyzed areas corresponding to the "SAMSUNG" signboard at the top left area and the "LG" signboard at the top center area.

Next, when the stop edge information is detected in each analyzed area, from among the analyzed areas, the analyzed areas in which a ratio of the areas occupied by the stop edge information is above a predetermined critical value are detected as the first candidate areas.

In FIG. 6, there is a high possibility that the analyzed areas in which the players who are still are centralized, and the analyzed areas corresponding to the scoreboard 610 and the title information 620 are detected as the first candidate areas. However, as described above, the analyzed areas may have small sizes of 8×8 pixels and 16×16 pixels so that the scoreboard 610 and the title information 620 may be respectively formed to correspond to the plurality of analyzed areas. For example, when the moving picture frame 600 illustrated in FIG. 6 is divided into hundreds of analyzed areas, the scoreboard 610 may include a few tens of analyzed areas.

In a second stage, when the first candidate areas are detected from the moving picture frame 600 illustrated in FIG. 6 and the moving picture frame adjacent to the moving picture frame 600, grouping is performed on the stop edge information included in the moving picture frame 600 illustrated in FIG. 6 from among the two moving picture frames, and thus, the second candidate areas are detected in the moving picture frame 600 illustrated in FIG. 6.

More specifically, the moving picture frame 600 illustrated in FIG. 6 is divided into a plurality of grouping areas and the stop edge information included in the first candidate areas is divided into a plurality of stop edge information. Then, grouping is repeatedly performed and the second candidate areas are determined.

For example, the moving picture frame 600 is divided into 9 grouping areas having the same size and the divided stop edge information may be set to have a size of 4×4 pixels. Hereinafter, it is assumed that the moving picture frame 600 is divided into 9 grouping areas and the divided stop edge information has a size of 4×4 pixels.

First, the divided stop edge information is included in the grouping areas at the center position that is closest to the divided stop edge information from among the 9 grouping areas.

Then, the centers of the divided stop edge information included in the grouping areas in each of the 9 grouping areas are determined as new center positions. Accordingly, when new center positions are set, the positions of 9 grouping areas may be changed based on the new center positions.

Next, the distance between the new center positions and each divided stop edge information is measured so as to include the divided stop edge information in the grouping areas located closest to the divided stop edge information.

When the grouping is repeatedly performed and it is determined that the positions of the previous center positions and the new center positions are not changed, the grouping areas by that time are determined as final grouping areas and the final grouping areas constitute the second candidate areas.

Although the number of first grouping areas is 9, the number of second candidate areas may be 9 or less because the areas in which there is no stop edge information present from among 9 grouping areas or a plurality of grouping areas may be combined to be one grouping area as a result of the grouping.

In FIG. 6, as a result of the grouping, three second candidate areas 610, 620, and 630 are generated.

In a third stage, the methods described with reference to FIGS. 4 and 5 are used to analyze the stop edge information included in the second candidate areas, 610, 620, and 630 of the moving picture frame 600 illustrated in FIG. 6.

That is, when the location and size of the second candidate areas, 610, 620, and 630, in the moving picture frames are determined through the first and second stages, whether the stop edge information included in the divided areas of the second candidate areas, 610, 620, and 630, in the moving picture frames is a character or number is determined. When the stop edge information is recognized as characters or numbers, the second candidate areas, 610, 620, and 630, in the moving picture frames are analyzed based on the recognized characters or numbers.

In a fourth stage, the scoreboard 610 is detected as the important information area based on the result of analysis of the stop edge information included in the second candidate areas, 610, 620, and 630, in the moving picture frame 600 illustrated in FIG. 6.

Here, the second candidate area 630 located at the center of the moving picture frame does not include characters or numbers and thus it is determined that the second candidate area 630 is not the important information area.

The scoreboard 610 and the title information 620 from among the second candidate areas, 610, 620, and 630, include a plurality of numbers and characters, and thus, may be determined as the important information areas. Accordingly, a method of detecting the scoreboard 610 as the important information from among the scoreboard 610 and the title information 620 is needed. For example, a method of detecting the important information area based on initial values of numbers respectively included in the scoreboard 610 and the title information 620, whether the numbers are changed, and whether the time consumed for changing the numbers is above a critical value may be used.

In FIG. 6, the numbers in the title information 620 are not changed throughout the moving picture frames, and thus, the title information 620 is excluded from the important information area. The scoreboard 610 is finally detected as the important information area.

In some cases, which information is the score information may be identified in the scoreboard 610. Here, if there are numbers which start from an initial value of 0 and change after at least few minutes, the numbers may be the score.

In FIG. 6, both current score information and current time start from 0, numbers that are changed in every minute exist in the numbers included in the current time information, and the score information is also numbers changed minute-by-minute (represented as 1-1 in FIG. 6). Thus, it may be difficult to classify the current score information and the current time information.

In this case, in order to accurately classify the current score information and the current time information, the location information of the divided areas in the second candidate area 610 may be used.

That is, the current time information in FIG. 6 is formed of 4 divided areas respectively displaying "3," "8", "2", and "7". If the divided areas including 4 stop edges are adjacent, the numbers included in the divided areas may be determined as the current time information.

In another exemplary embodiment, when the scoreboard 610 is detected as the important information in FIG. 6, a highlight of the soccer game may be reproduced based on the time when the numbers of the score of the soccer game are changed from among information included not only in the scoreboard 610 but also in scoreboards in a plurality of moving picture frames.

That is, moving picture frames that are before and after the moving picture frame in the moment the score is changed are the important moving picture frames in the soccer game. Thus, when the sports highlight is reproduced with the moving picture frames, the highlight of the soccer game may be reproduced without an error. The method may be applied to all sports displaying scores, such as baseball games and volleyball games.

As another exemplary embodiment, when the scoreboard 610 is detected as the important information in FIG. 6, the detected scoreboard 610 itself may be transmitted to a third party in an image form or the score information included in the scoreboard 610 may be transmitted to a third party in a message form using characters and numbers. For example, the scoreboard 610 or the score information in the scoreboard 610 may be transmitted to a third party as E-MAIL, Short Message Service (SMS), or Multimedia Messaging Service (MMS). Here, the third party may receive E-MAIL, SMS, or MMS for the scoreboard 610 or the score information in the scoreboard 610 through a computer or a mobile phone. Here, the scoreboard 610, which is one of the scoreboards detected in each of the plurality of moving picture frames, is transmitted to a third party.

Figure 7:
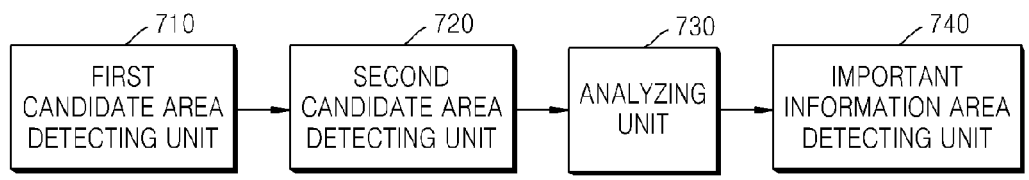
FIG. 7 is a block diagram of an apparatus for detecting important information from a moving picture, according to an exemplary embodiment.

FIG. 7 is a block diagram of an apparatus for detecting important information from a moving picture, according to an exemplary embodiment.

Referring to FIG. 7, the apparatus for detecting important information, according to the current exemplary embodiment, includes a first candidate area detecting unit 710, a second candidate area determining unit 720, an analyzing unit 730, and an important information area detecting unit 740.

The first candidate area detecting unit 710 detects the first candidate areas that are presumed to include important information in the moving picture frames by using the stop edge information from among edge information in at least two received moving picture frames (see e.g., FIG. 2).

The second candidate area determining unit 720 determines the second candidate areas by performing grouping on the stop edge information according to the position of the stop edge information in the first candidate areas (see e.g., FIG. 3).

Here, the second candidate area determining unit 720 may determine the second candidate areas from among each of the at least two received moving picture frames, or may determine the second candidate areas from one moving picture frame in a plurality of moving picture frames and then use the second candidate areas in the remaining moving picture frames.

The analyzing unit 730 analyzes the second candidate areas determined by the second candidate area determining unit 720.

More specifically, the analyzing unit 730 analyzes the stop edge information included in divided areas of the second candidate areas in each of the moving picture frames (see e.g., FIGS. 4 and 5).

The important information area detecting unit 740 detects the important information areas from at least two moving picture frames based on the analysis.

More specifically, the important information area detecting unit 740 detects the important information areas from the second candidate areas in each of the moving picture frames.

Here, the important information area detecting unit 740 may also detect important information included in the important information areas. For example, when the scoreboard is detected as the important information, the score information in the scoreboard may also be detected.

The apparatus for detecting the important information, according to the current exemplary embodiment, may further include a highlight reproducing unit (not illustrated) which detects the important information areas from at least two moving picture frames and reproduces the highlight of sports games based on the time when the numbers for the score of the sports games are changed from among the important information included in the important information areas.

The apparatus for detecting the important information according to the current exemplary embodiment may further include a transmitter (not illustrated) which detects the important information areas from at least two moving picture frames and transmits one of the important information areas detected from at least two moving picture frames to a third party in an image form or transmits the important information included in the important information areas to a third party in a message form using characters and numbers.

The exemplary embodiments can be written as computer programs which can be implemented in general-use digital computers that execute the programs using a computer readable recording medium which has the program(s) encoded thereon. Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of detecting important information, the method comprising:
    detecting first candidate areas that are presumed to include important information in a plurality of moving picture frames by using stop edge information, which exists at a same position throughout the plurality of moving picture frames and is overlapped at the same position throughout the plurality of moving picture frames, from among edge information in at least two received moving picture frames;
    determining second candidate areas by performing grouping on the stop edge information according to a position of the stop edge information in the first candidate areas, wherein the position of the stop edge information is determined based on a distance from reference positions;
    analyzing the second candidate areas determined in the at least two moving picture frames; and
    detecting important information areas from each of the at least two moving picture frames based on the analysis.

2. The method of claim 1, wherein the detecting of the first candidate areas comprises:
    respectively dividing the at least two moving picture frames into a plurality of analyzed areas;
    detecting the edge information from the plurality of analyzed areas;
    detecting the edge information that is overlapped at the same position throughout the plurality of moving picture frames from among the edge information detected from the plurality of analyzed areas as the stop edge information; and
    detecting the first candidate areas, from among the analyzed areas, in which a ratio of areas occupied by the stop edge information is above a predetermined critical value.

3. The method of claim 2, wherein in the detecting of the edge information from the plurality of analyzed areas, the analyzed areas which are presumed to not include important information from among the plurality of analyzed areas based on the positions of the analyzed areas in the moving picture frames are excluded from being analyzed for the edge information.

4. The method of claim 1, wherein the determining of the second candidate areas comprises:
dividing one of the moving picture frames into a plurality of grouping areas;
dividing the stop edge information included in the first candidate areas into a plurality of stop edge information;
allocating each of the divided stop edge information to one of the grouping areas based on a distance between the reference positions of the grouping areas and the divided stop edge information; and
determining the second candidate areas by repeatedly performing grouping based on a distance between centers of the divided stop edge information included in the grouping areas in each of the grouping areas and the divided stop edge information,
wherein the reference positions include center positions of the grouping areas.

5. The method of claim 1, wherein the analyzing the second candidate areas comprises:
converting the stop edge information included in the second candidate areas to be displayed in a predetermined number of colors;
performing binarization on the stop edge information that is converted in the second candidate areas to be displayed in two colors;
dividing the second candidate areas into a plurality of areas; and
analyzing the binarized stop edge information included in each of the divided areas.

6. The method of claim 5, wherein the analyzing of the binarized stop edge information included in each of the divided areas comprises:
determining whether the binarized stop edge information respectively included in the divided areas of the second candidate areas is a character or a number;
recognizing characters or numbers indicated by one of the stop edge information respectively included the divided areas; and
analyzing the binarized stop edge information respectively included in the divided areas based on the recognized characters or numbers.

7. The method of claim 6, wherein in the detecting of the important information areas, the important information areas are detected based on at least one of the information whether characters or numbers are included in the second candidate areas and whether the characters or the numbers are changed.

8. A method of detecting important information, the method comprising:
detecting first candidate areas that are presumed to include important information in a plurality of moving picture frames by using stop edge information, which is edge information overlapped at a same position throughout the plurality of moving picture frames, from among edge information in at least two received moving picture frames;
determining second candidate areas by performing grouping on the stop edge information according to a position of the stop edge information in the first candidate areas;
analyzing the second candidate areas determined in the at least two moving picture frames; and
detecting important information areas from each of the at least two moving picture frames based on the analysis;
wherein the analyzing the second candidate areas comprises:
converting the stop edge information included in the second candidate areas to be displayed in a predetermined number of colors;
performing binarization on the stop edge information that is converted in the second candidate areas to be displayed in two colors;
dividing the second candidate areas into a plurality of areas; and
analyzing the binarized stop edge information included in each of the divided areas;
wherein the analyzing of the binarized stop edge information included in each of the divided areas comprises:
determining whether the binarized stop edge information respectively included in the divided areas of the second candidate areas is a character or a number;
recognizing characters or numbers indicated by one of the stop edge information respectively included the divided areas; and
analyzing the binarized stop edge information respectively included in the divided areas based on the recognized characters or numbers; and
wherein, when the stop edge information included each of the divided areas are recognized as numbers in the detecting of the important information areas, the important information areas are detected based on initial values of the numbers and whether a time consumed for changing the numbers is above a critical value.

9. The method of claim 1, further comprising reproducing a highlight of a sports game based on a time corresponding to when a number of a score of the sports game, from among the important information included in the important information areas, is changed, after detecting the important information areas from the at least two moving picture frames.

10. The method of claim 1, further comprising transmitting one of the important information areas detected from at least two moving picture frames to a third party in an image form or transmitting the important information included in the important information areas to a third party in a message form using characters and numbers, after detecting the important information areas from at least two moving picture frames.

11. An apparatus for detecting important information, the apparatus comprising:
a first candidate area detecting unit which detects first candidate areas that are presumed to include important information in a plurality of moving picture frames by using stop edge information, which exists at a same position throughout the plurality of moving picture frames and is overlapped at the same position throughout the plurality of moving picture frames, from among edge information in at least two moving picture frames;
a second candidate area determining unit which determines second candidate areas by performing grouping on the stop edge information according to the position of the stop edge information in the first candidate areas, wherein the position of the stop edge information is determined based on a distance from reference positions;
an analyzing unit which analyzes the second candidate areas determined in the at least two moving picture frames; and
an important information area detecting unit which detects important information areas from each of the at least two moving picture frames based on the analysis.

12. The apparatus of claim 11, wherein the first candidate area detecting unit respectively divides the at least two moving picture frames into a plurality of analyzed areas, detects the edge information from the plurality of analyzed areas, detects the edge information that is overlapped at a same position throughout the plurality of moving picture frames from among the edge information detected from the plurality of analyzed areas as the stop edge information, and from among the analyzed areas, detects the first candidate areas in which a ratio of areas occupied by the stop edge information is above a predetermined critical value.

13. The apparatus of claim 12, wherein the first candidate area detecting unit does not analyze the analyzed areas from among the plurality of analyzed areas for the edge information which are presumed to not include important information based on positions of the analyzed areas in the moving picture frames.

14. The apparatus of claim 11,
wherein the second candidate area determining unit divides one of the moving picture frames into a plurality of grouping areas, divides the stop edge information included in the first candidate areas into a plurality of stop edge information, allocates each of the divided stop edge information to one of the grouping areas based on a distance between the reference positions of the grouping areas and the dividing stop edge information, and determines the second candidate areas by repeatedly performing grouping based on a distance between centers of the divided edge information included in the grouping areas in each of the grouping areas and the divided stop edge information,
wherein the reference positions include center positions of the grouping areas.

15. The apparatus of claim 11, wherein the analyzing unit converts the stop edge information included in the second candidate areas to be displayed in a predetermined number of colors, performs binarization on the stop edge information that is converted in the second candidate areas to be displayed in two colors, and divides the second candidate areas into a plurality of divided areas, and analyzes the binarized stop edge information included in each of the divided areas.

16. The apparatus of claim 15, wherein the analyzing unit determines whether the binarized stop edge information respectively included in the divided areas of the second candidate areas is a character or number, recognizes characters or numbers indicated by one of the stop edge information respectively included in the divided areas, and analyzes the binarized stop edge information respectively included in the divided areas based on the recognized characters or numbers.

17. The apparatus of claim 16, wherein the important information area detecting unit detects the important information areas based on at least one of the information whether characters or numbers are included in the second candidate areas and whether the characters or the numbers are changed.

18. The apparatus of claim 16, wherein, when the stop edge information included in each of the divided areas are recognized as numbers, the important information area detecting unit detects the important information areas based on initial values of the numbers and whether a time consumed for changing the numbers is above a critical value.

19. The apparatus of claim 11, further comprising a highlight reproducing unit which reproduces a highlight of sports game based on a time corresponding to when a number of a score of the sports game, from among the important information included in the important information areas, is changed, after the important information area detecting unit the detects the important information areas from the at least two moving picture frames.

20. The apparatus of claim 11, further comprising a transmitter which transmits one of the important information areas detected from at least two moving picture frames to a third party in an image form or the important information included in the important information areas to a third party in a message form using characters and numbers, after the important information area detecting unit detects the important information areas from the at least two moving picture frames.

21. A non-transitory computer readable recording medium having embodied thereon a computer program which causes a computer to execute the method of claim 1.

* * * * *